United States Patent [19]
Yamano

[11] Patent Number: 6,009,461
[45] Date of Patent: Dec. 28, 1999

[54] UNATTENDED AUTOMATIC CONTRACT RECEPTION SYSTEM USING A SELECTION UNIT TO AUTOMATICALLY SELECT A CLIENT TERMINAL THAT SENDS REQUEST AND DATA TO AN OUTPUT UNIT

[75] Inventor: Nanako Yamano, Tokyo, Japan

[73] Assignee: Oki Electric Industry Co., Ltd., Tokyo, Japan

[21] Appl. No.: 08/929,666

[22] Filed: Sep. 15, 1997

[30] Foreign Application Priority Data

Feb. 28, 1997 [JP] Japan .................................. 9-045065

[51] Int. Cl.⁶ ................................................... G06F 13/00
[52] U.S. Cl. ........................ 709/204; 709/205; 709/225; 709/238
[58] Field of Search ..................... 348/15, 705; 345/328; 709/204, 205, 225, 238

[56] References Cited

U.S. PATENT DOCUMENTS

| | | | |
|---|---|---|---|
| 5,835,129 | 11/1998 | Kumar ........................................ | 348/15 |
| 5,838,393 | 11/1998 | Simpson et al. ......................... | 348/705 |
| 5,852,438 | 12/1998 | Tomizawa et al. ...................... | 345/328 |
| 5,854,893 | 12/1998 | Ludwig et al. ..................... | 395/200.34 |

Primary Examiner—Le Hien Luu
Attorney, Agent, or Firm—Venable; Robert J. Frank; Norman N. Kunitz

[57] ABSTRACT

An unattended automatic contract reception system according to thepresent invention comprises a plurality of client terminals 10, 10a etc. at which a client enters prescribed contract data, to make unattended contract with a host enterprise, and also a monitor terminal connected with each of those client terminals via a communication line network 20. Each of those client terminals 10, 10a etc. comprises: client data capture units 12 and 13 which capture the client's image data and speech data as client data; a data transmission unit 14 which sends contract data and client data; and an output request transmission unit 15 which sends out output requests concerning the client data, while the monitor terminal 30 comprises: a plurality of data reception units 31 which receive data sent from each client terminal; an output unit 34 which outputs image data and speech data; and selection units 32 and 33 which choose a client terminal which provides an output via the output unit according to an output request received by the data reception unit. Such a configuration will enables the system to automatically switch both image data and speech data sent from a plurality of client terminals as occasion demands and then output the data at the monitor terminal, reducing burden on the operator at that terminal.

5 Claims, 4 Drawing Sheets

PRIOR ART

UNATTENDED AUTOMATIC CONTRACT RECEPTION SYSTEM USING A SELECTION UNIT TO AUTOMATICALLY SELECT A CLIENT TERMINAL THAT SENDS REQUEST AND DATA TO AN OUTPUT UNIT

BACKGROUND OF THE INVENTION

The present invention relates in general to an unattended automatic contract reception system and more specifically to such an unattended automatic contract reception system that a user can make a contract of financial business with a financial organization through an unattended automatic contract machine.

Recently, in Japan, Korea, and other Asian countries, the unattended automatic contract machines have been highly evaluated by the users as a new financial service in the multimedia age. This is probably because of their highly functional and user-friendly operability and consideration of the users' privacy. The enterprise side also can enjoy various advantages, because they can largely save personnel expenses and do not have to start out with large shops but only with small ones used exclusively for unattended automatic contract reception, to capture a lot of clients. With this, demands for the unattended automatic contract machine are expected to increase more and more not only in Japan but also worldwide.

Such unattended automatic contract machines are generally used in an unattended automatic contract reception system such as shown in FIG. 5.

An unattended automatic contract reception system comprises an unattended automatic contract machine (hereinafter called a client terminal) 10 and a monitor or surveillance terminal 40 installed on the side of a host enterprise connected with this client terminal 10 via a communication line 20, so that the monitor terminal 40 can monitor and confirm various unattended contract applications, for example, those for a users' financial dealing which is made via the client terminal 10.

For this purpose, the client terminal 10 comprises: a Cathode Ray Tube (CRT) 11 equipped with a touch panel which permits a user (client) to enter prescribed contract data; a camera 12 which takes pictures, both still images and dynamic images, of the user operating the machine; a microphone 13 which picks up the user's speech; a communication control portion 14 which communicates the entered image data and the speech data; and an operation control portion 15 which controls the operations of this client terminal 10 as a whole.

Also, the monitor terminal 40 installed on the side of the host enterprise comprises: a center terminal 41 equipped with a CRT, keyboard, etc.; a communication control unit 42 which is connected with this center terminal 41 and, at the same time, transfers image and speech data with the client terminals 10 in a communication line network 20; and a headset 43 which is used by the operator (attendant) at the center terminal 41.

With such an unattended automatic contract reception system, when a user who has shown up at the client terminal 10 starts operation on the CRT11 equipped with a touch panel, the operation control portion 15 sends a "connection request" for the line to the center terminal 41. Upon receiving the "connection request" from the client terminal 10, the center terminal 41 identifies which one of the client terminals 10 in the communication line network 20 has sent that "connection request." Based on the identification results, the center terminal 41 instructs the communication control unit 42 to establish a line connection with the client terminal 10 that asked for that "connection request." According to this instruction, the communication control unit 42 establishes a line connection with the communication control portion 14 of the client terminal 10.

When the line connection is established between the communication control unit 42 and the communication control portion 14, the communication control portion 14 at the client terminal 10 sends both the image data obtained with the camera 12 and the speech data obtained with the microphone 13, to the communication control unit 42 via the communication line network 20.

Then, the communication control unit 42 gives an overlay display (window display) of the received image data in an area 41a on the CRT screen at the center terminal 41 and, at the same time, sends out the received speech data to the headset 43.

In such a type of an unattended automatic contract reception system, the image data and the speech data (hereinafter called client data collectively) of a client utilizing the client terminal 10 will thus be sent out from the side of the monitor terminal 40, so that its operator can monitor the situation of the user at the client terminal 10.

In the above-mentioned conventional unattended automatic contract reception systems, however, each center terminal 41 is connected with only one communication control unit 42. This is because the center terminal 41 can output (control) only the image data from one communication control unit 42 at a time. This holds true not only with the center terminal 41 but also with the headset 43.

In an unattended automatic contract reception system, however, generally a plurality of client terminals are installed in the communication line network 20. Therefore, the center terminal 41, which can control only one communication control unit 42 at a time, has to switch, as required, its line connection to each of a plurality of client terminals to cope with them during monitoring. Moreover, this operation must be carried out manually through the keyboard etc. by the operator at the center terminal 41.

The conventional unattended automatic contract reception systems, therefore, place a heavy burden on the operator at the center terminal 41 when he attempts to use only one center terminal 41 to monitor the operational situation of a plurality of client terminals. This may lead to a lot of mistakes in operation.

SUMMARY OF THE INVENTION

It is therefore an object of the present invention to provide a novel and improved unattended automatic contract reception system that can automatically switch a plurality of client terminals as required to send out the client data from the terminal currently monitored, thus reducing the burden on the operator.

An another object of the present invention is to provide a novel and improved unattended automatic contract reception system that can switch a plurality of client terminals as occasion demands to output their desired requests at the monitor terminal, thus reducing the occurrence of errors in monitoring.

A further object of the present invention is to provide a novel and improved unattended automatic contract reception system that enables the monitor terminal, even if equipped with only one data output means, to cope with a plurality of client terminals in a flexible manner when they make access to it simultaneously.

To solve the above-mentioned problems, an unattended automatic contract reception system according to the present invention comprises a plurality of client terminals which make an unattended contract with the host enterprise when clients enter prescribed contract data, and also a monitor terminal connected with the plurality of client terminals via a communication line network. Each of the plurality of terminals comprises: a client data capture unit which obtains image data and speech data of those clients as client data; a data transmission unit which sends the contract data and the client data; and an output request transmission unit which sends output requests concerning the client data. The monitor terminal, on the other hand, comprises: a plurality of data reception units which receive data sent from the above-mentioned client terminals; an output unit which sends out image data and speech data; and a selection unit which chooses a desired client terminal to which necessary data is sent by the above-mentioned output unit, according to an output request received by the above-mentioned reception unit.

The aforementioned and other features and objects of the present invention and the manner of attaining them will become more apparent and the invention itself will be best understood by reference to the following description of a preferred embodiment taken in conjunction with the accompanying drawings.

BRIEF DESCRIPTION OF THE DRAWINGS

The above and other features of the invention and concomitant advantages will be better understood and appreciated by those skilled in the field to which the invention pertains in view of the following description given in conjunction with the accompanying drawings which illustrate preferred embodiments.

DETAILED DESCRIPTION OF THE PREFERRED EMBODIMENTS

Various preferred embodiments of an unattended automatic contract reception system (hereinafter called a system simply) according to the present invention will be detailed with reference to the accompanying drawings.

Figure 1:
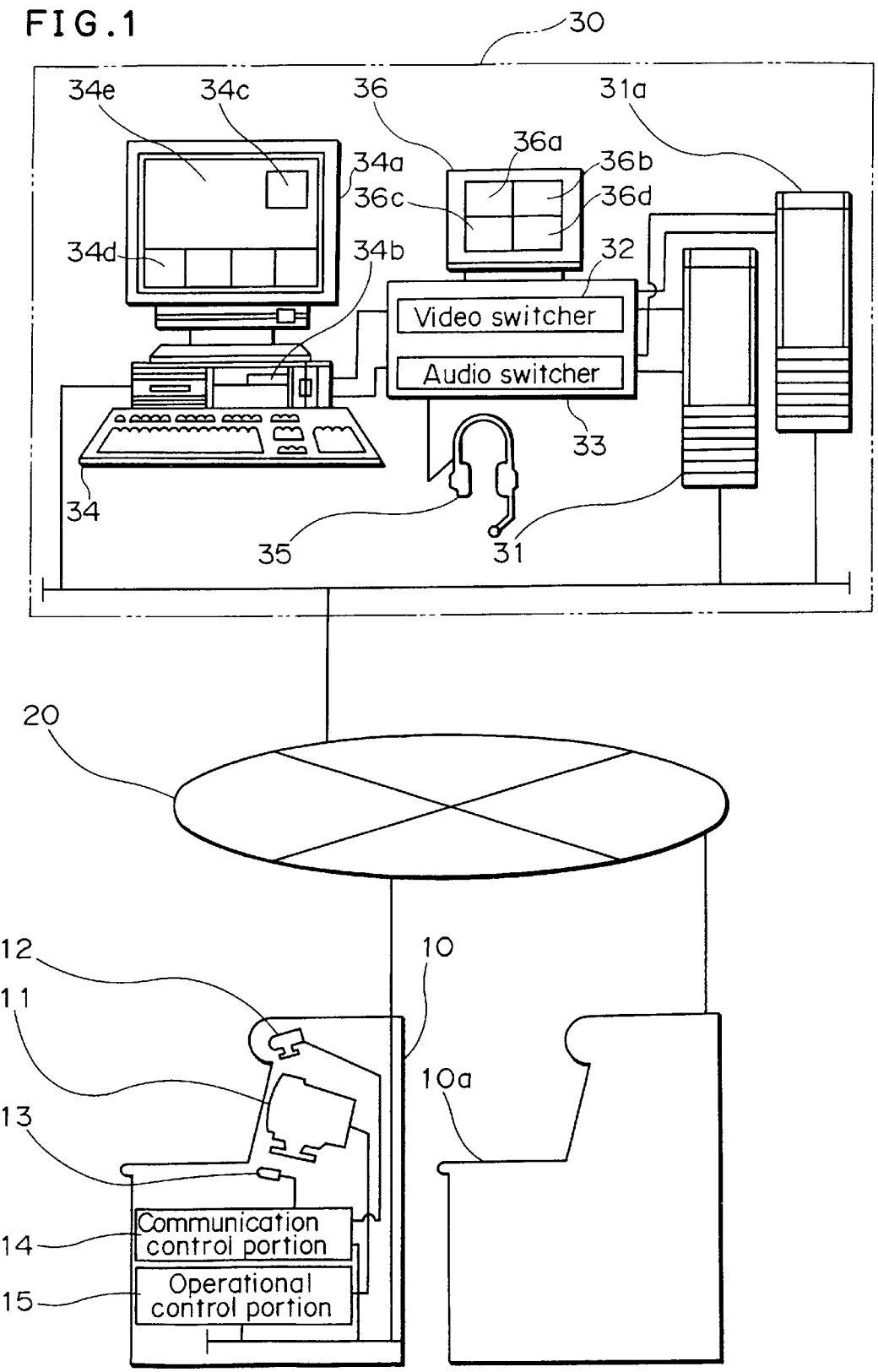
FIG. 1 is a schematic illustration of an embodiment of an unattended automatic contract reception system according to the present invention.

A system according to this embodiment comprises, as shown in FIG. 1, a plurality of client terminals 10, 10a, etc. and a monitor terminal 30 connected with them via a communication line network 20.

Figure 5:
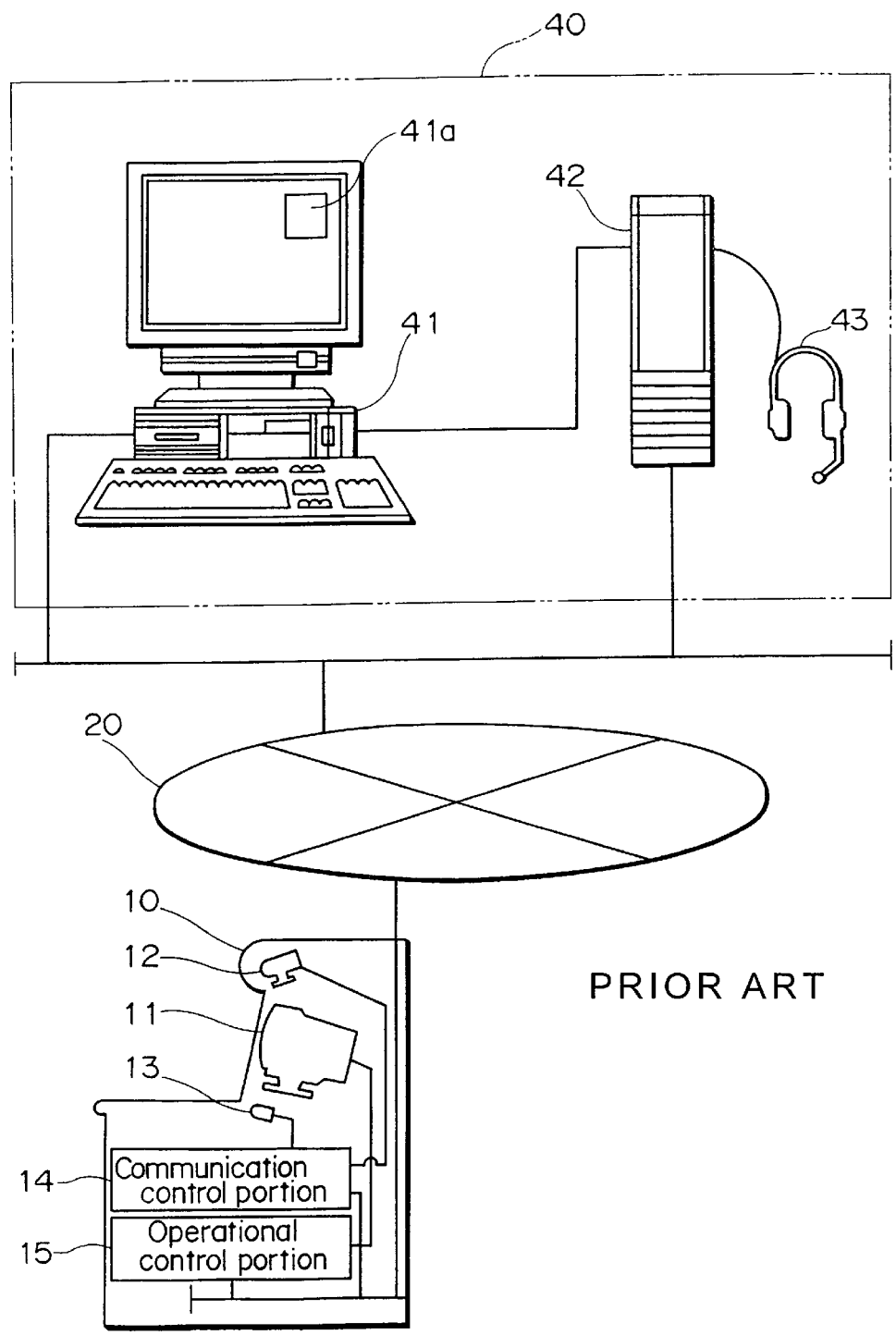
FIG. 5 is a schematic illustration of an embodiment of a conventional unattended automatic contract reception system.

Like a conventional system shown in FIG. 5, each of the client terminals 10, 10a, etc. is provided with: a CRT11 equipped with a touch panel; a camera 12; a microphone 13; a communication control portion 14; and an operation control portion 15.

This operation control portion 15 has a function to control a operation of all of a client terminals as well as a function to send requests for outputting both the image data entered at the camera 12 and the speech data entered at the microphone 13, to the monitor terminal 30 via the communication line network 20. Those output requests include a "connection request" transferred at the beginning of the operation by the user and a "disconnection request" transferred at the termination of the operation by the user.

That is, each of the client terminals 10, 10a, etc. is provided with the camera 12; the microphone 13; the communication control portion 14 which acts as data transmission means; and the operation control portion 15 which acts as request transmission means.

The monitor terminal 30, on the other hand, comprise: a plurality of communication control units 31, 31a etc. which correspond to the above-mentioned client terminals 10, 10a etc. respectively; a video switcher 32 connected to those communication control units 31, 31a etc.; an audio switcher 33 connected likewise to the above-mentioned communication control units 31, 31a etc.; a center terminal 34 consisting of a personal computer (hereinafter abbreviated as PC) a workstation etc.; a headset 35 connected to the audio switcher 33; and a divided-by-4 monitor 36 connected to the video switcher 32.

Each of the plurality of communication control units 31, 31a etc. comprises a, so-called, multimedia communication control unit, so that it can be connected with another communication control unit, e.g. the communication control portion 14 of the client terminal 10, via the communication line network 20, to transfer output data with it. A multimedia communication control unit here, usually employed in a well-known TV conference system etc., can be connected with a PC etc. to output image or speech data on this PC.

That is, those communication control units 31, 31a etc. will act as data reception means in the present invention.

The video switcher 32 comprises a, so-called, image transfer unit, i.e., a matrix switcher with 16 input ports and another 16 output ports which is remote-controllable by means of an interface in accordance with RS-232C. As this type of image transfer unit, for example, the one used in image transfer on TV monitors for monitoring is publicly known.

The audio switcher 33 comprises a, so-called, speech transfer unit, i.e., a matrix switcher with 16 input ports and another 16 output ports which is remote-controllable by means of an interface in accordance with RS-232C.

That is, the video switcher 32 and the audio switcher 33 will make a switch-over among the communication control units 31, 31a etc., to choose the output data received by the chosen one.

The center terminal 34 is connected with the communication line network 20 as well as with both the video switcher 32 and the audio switcher 33 via an interface in accordance with RS-232C. At this center terminal 34, when having received an output request from any of the client terminal 10, 10a etc. via the communication line network 20, the video switcher 32 and the audio switcher 33 decide data to be output, based on that output request, and then are instructed by a Recommended Standard (RS) command, a data transfer command, to output the data.

The center terminal 34, on the other hand, is provided with a CRT34a and an overlay board 34b. This overlay board 34b comprises a video board which can overlay image data on the contents displayed on the screen of the CRT34a. With this function, the center terminal 34 can give an overlay display of the image data of the client data chosen by the video switcher 32 in the right top area 34c of the CRT34a's screen and also an overlay display of the information of a client terminal currently connected to the monitor terminal 30 at the bottom of the screen 34d. The background 34e of the CRT34a displays the same contents of a screen as those displayed to the client at the client terminal 10 currently selected.

The headset 35, when put on by an operator at the center terminal 34, will feed out speech data chosen by the audio switcher 33.The divided-by-4 monitor 36 comprises, for example, a TV monitor used for monitoring, to simultaneously display the image data sent from the client terminals 10, 10a etc., i.e., their respective image data before they are chosen by the video switcher 32.

Next, the following will describe how the thus configurated system would operate when the monitor terminal 30 has received an output request from any of the client terminal 10, 10a etc.

Figure 2:
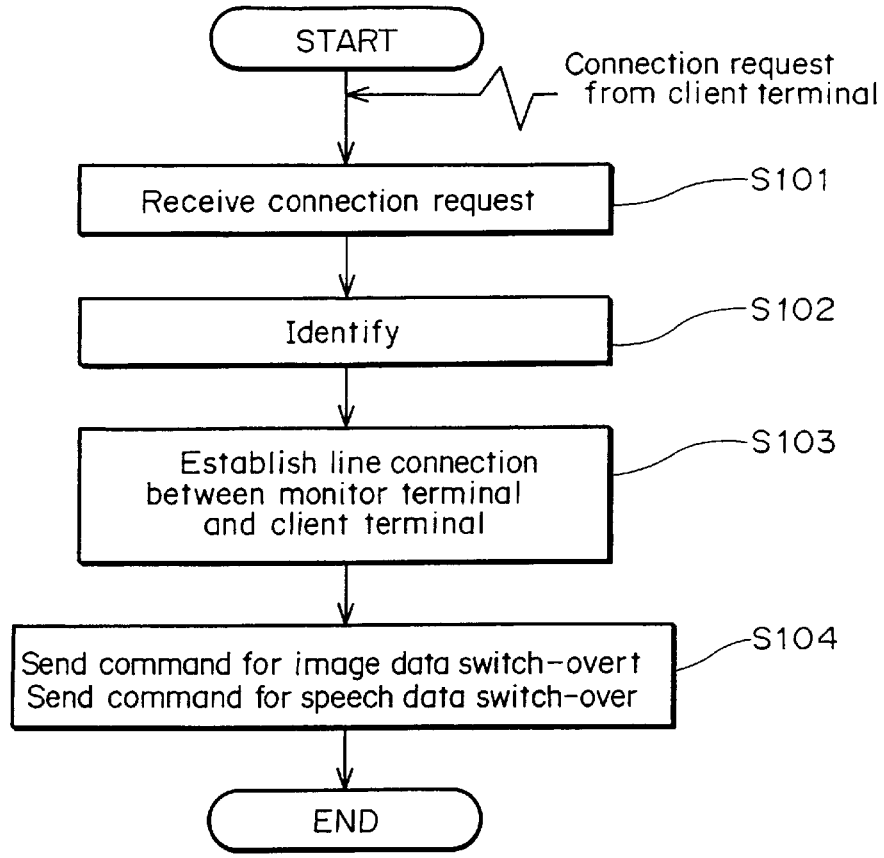
FIG. 2 is a flowchart showing a procedure at a monitor terminal in the unattended automatic contract reception system shown in FIG. 1 in the case where that monitor terminal has received a connection request from client terminal.

First, how the system would operate when the monitor terminal 30 has received a "connection request" from a client terminal 10 is described with reference to the flowchart shown in FIG. 2.

When a user who has shown up at a client terminal 10 is detected by its proximity sensor (not shown), the operation control portion 15 controls the client terminal 10 as a whole so that the user can use it and sends a "connection request" to the monitor terminal 30.

When the "connection request" is sent from the operation control portion 15 of the client terminal 10, the center terminal 34 receives it via the communication line network 20 (step 100, hereinafter abbreviated as S101) and then identifies which one of the client terminals 10, 10a etc. has sent that "connection request" (S102). This identification may be made on the basis of an identifier (flag) of the "connection request."

When having identified the transmission source of the "connection request," the center terminal 34 instructs a communication control unit 31 which corresponds to the client terminal 10 that has sent the "connection request" among a plurality of communication control units 31, 31a etc., to have a line connection with the client terminal 10. According to this instruction, the communication control unit 31 establishes a line connection with the communication control portion 14 of the client terminal 10 (S103).

At this point in time, the client terminal 10 already has an image of the user himself and his image at hand entered by the camera 12 and also his speech entered at the microphone 13. When, therefore, a line connection is established between the communication control unit 31 and the communication control portion 14, the output data entered at the camera 12 and the microphone 13 is sent via the communication control portion 14 and the communication control unit 31 to the video switcher 32 and the audio switcher 33, respectively. The divided-by-4 monitor 36 displays the image data sent to the video switcher 32 in the relevant area 36a on its own screen.

The center terminal 34, on the other hand, instructs the communication control unit 31 for a line connection and then decides to output the data sent out from the client terminal 10 that has sent the "connection request" and sends an RS command to that effect to both the video switcher 32 and the audio switcher 33 (S104). With this, the center terminal 34 displays on the screen of the CRT34a the image data sent from the client terminal 10 chosen by the video switcher 32. At the same time, the headset 35 outputs the speech data from the client terminal 10 chosen by the audio switcher 33.

Thus, the monitor terminal 30 feeds out output data in response to a "connection request" sent from a client terminal 10.

Like the above-mentioned one, in this case also, the center terminal 34 identifies terminals based on a "connection request" sent from the client terminal 10a and, based on the identification results, instructs the communication control unit 31a to establish a line connection with the client terminal 10a. When the communication control unit 31a has established a line connection, output data from the client terminal 10a is sent to the video switcher 32 and the audio switcher 33.

Then, the divided-by-4 monitor 36 displays in the relevant area 36b on its own screen the image data sent to the video switcher 32. That is, the divided-by-4 monitor 36 simultaneously displays the image data from the client terminal 10 and that from the client terminal 10a.

Based on the "connection request" from the client terminal 10a, the center terminal 34 decides to feed out the output data from the client terminal 10a and sends an instruction (RS command) to that effect to both the video switcher 32 and the audio switcher 33. With this, the display by the CRT34a of the center terminal 34 switches to the image data from the client terminal 10a. The output from the headset 35, on the other hand, is switched to the speech data from the client terminal 10a.

Thus, if it receives another "connection request" from any other client terminal 10a when feeding out the output data from a client terminal 10, the monitor terminal 30 automatically makes a switch-over in feed-out of the output data based on that "connection request." When such a switch-over in output is made, the output data being fed out from the client terminal 10 is not fed out any more from the CRT34a nor the headset 35. Such a switch-over in output, however, develops no troubles because the monitor terminal 30 is only monitoring the operations by the user at any one of the client terminals 10, 10a etc. Moreover, like the conventional systems, it is possible to switch the output manually from the keyboard etc. of the center terminal 34.

Figure 3:
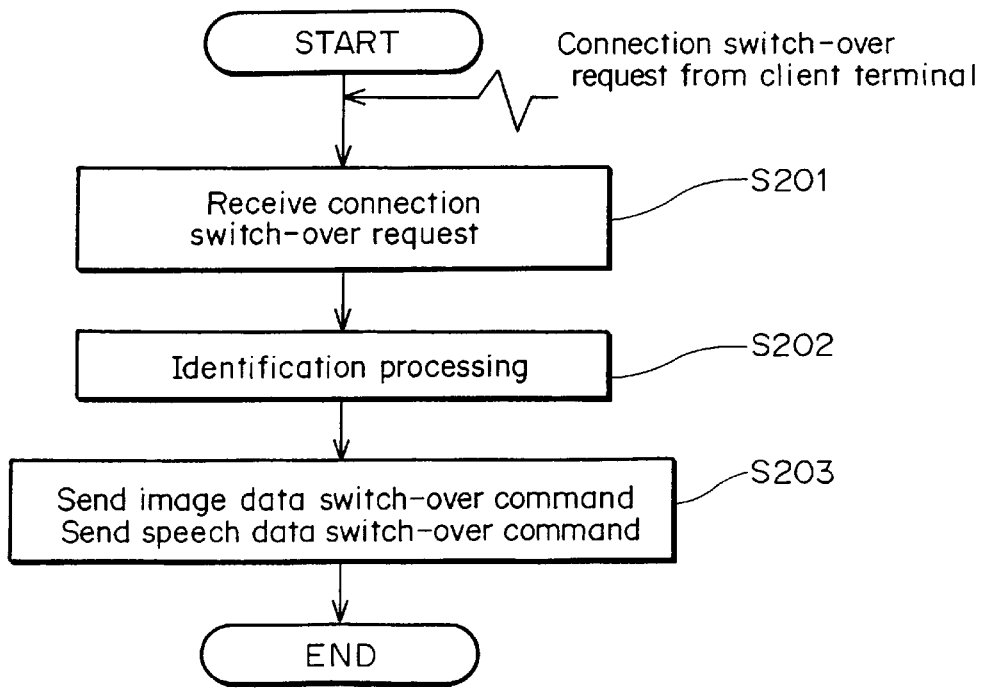
FIG. 3 is a flowchart showing a procedure at a monitor terminal in the unattended automatic contract reception system shown in FIG. 1 in the case where that monitor terminal has received a connection transfer request from a client terminal.

Next, the following will describe how the system operates when the monitor terminal 30 has received another "connection switch-over request" from any other client terminal 10a when it is feeding out output data from a client terminal 10, with reference to the flowchart in FIG. 3.

It is assumed here that a line connection is already established between the client terminal 10 and the communication control unit 31 and also between the client terminal 10a and the communication control unit 31a and also that the CRT34a and the headset 35 have already provided the output data sent from the client terminal 10.

If, at the client terminal 10, a user presses the "attendant call button" on the CRT11 equipped with a touch panel or inserts an application form etc., necessary for a trading contract, the operation control portion 15 of this client terminal 10a sends a "connection switch-over" request" to the monitor terminal 30.

When the operation control portion 15 of the client terminal 10a has sent the "connection switch-over request," the center terminal 34 receives that "connection switch-over request" via the communication line network 20 (S201) and, at the same time, identifies which one of the client terminals 10, 10a etc. has sent that received "connection switch-over request" (S202).

When having identified a transmission source of the "connection switch-over request," the center terminal 34 decide to feed out the output data sent from the client terminal 10a that has sent that "connection switch-over request" and then sends an RS command to that effect to both the video switcher 32 and the audio switcher 33 (S203). With this, the display by the CRT34a at the center terminal 34 switches to the image data sent from the client terminal 10a. At the same time, the output from the headset 35 is switched to the speech data sent from the client terminal 10a.

Thus, if it receives a "connection switch-over request" from another client terminal 10a when feeding out the output data sent from a client terminal 10, the monitor terminal 30 automatically makes a switch-over in feed-out of the output data based on the the "connection switch-over request." That is, a switch-over in the feed-out of output data is automatically performed depending on the operational situation of the user at the client terminal 10, 10a etc., i.e., as occasion demands.

Figure 4:
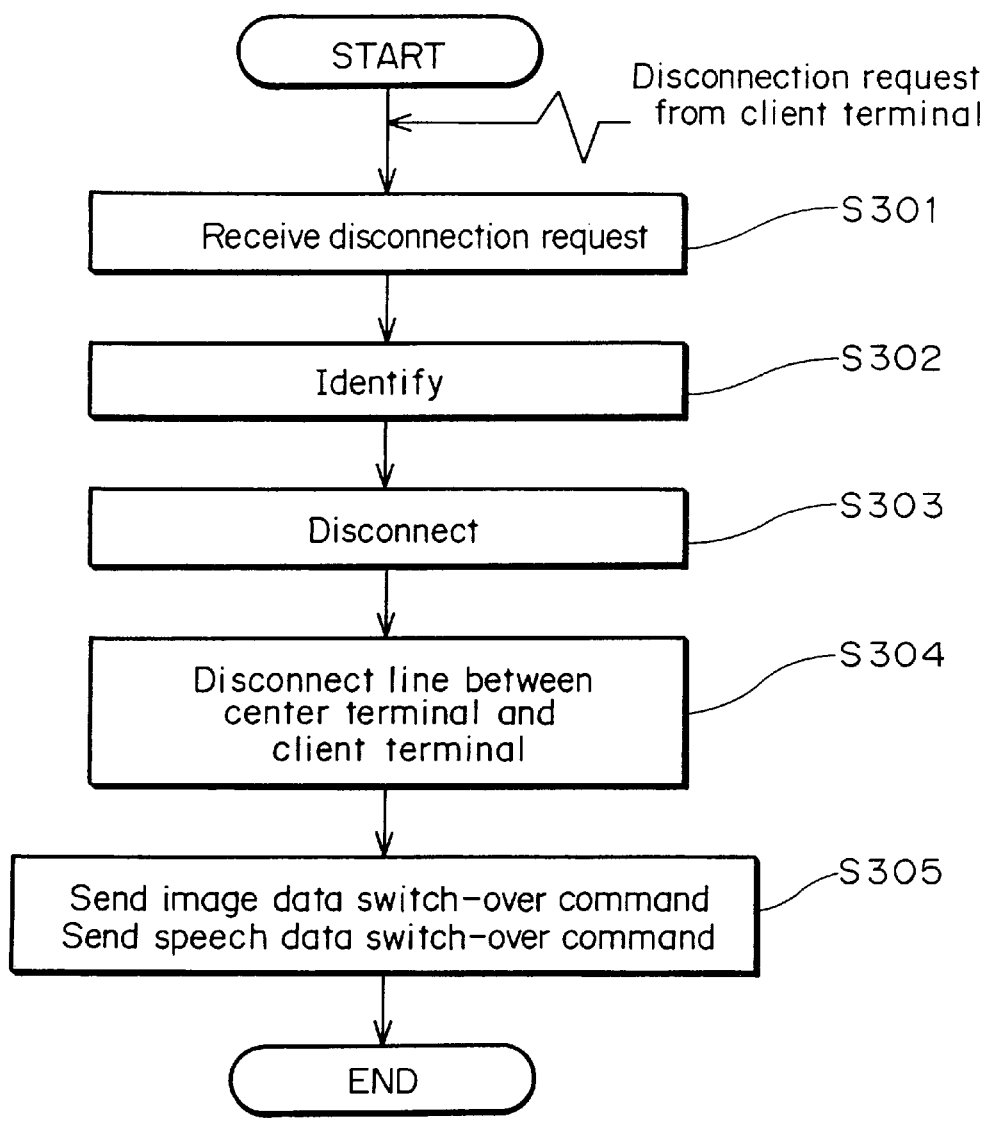
FIG. 4 is a flowchart showing a procedure at a monitor terminal in the unattended automatic contract reception system shown in FIG. 1 in the case where that monitor has received a disconnection request from a client terminal.

Next, the following will describe how the system operates if the monitor terminal 30 receives a "disconnection request" from a client terminal 10 when feeding out the output data sent from the client terminal 10, with reference to the flowchart shown in FIG. 4.

It is assumed, here, that a line connection is already established between the client terminal 10 and the communication control unit 31 and also between the client terminal 10a and the communication control unit 31a and also that the CRT34a screen and the headset have provided the output data sent from the client terminal 10.

In this case, when a user has finished his operation at the client terminal 10, the operation control portion 15 of the client terminal 10 sends a "disconnection request" to the monitor terminal 30.

When the "disconnection request" is sent from the operation control portion 15 of the client terminal 10, the center terminal 34 receives that "disconnection request" via the communication line network 20 (S301) and identifies which one of the client terminals 10, 10a etc. has sent that "disconnection request" received (S302).

When having identified the transmission source of the "connection switch-over request," the center terminal 34 disconnects communication between itself and the client terminal 10 which has sent the "connection switch-over request" (inter-PC connection) (S303) and, at the same time, instructs the communication control unit 31 for disconnection with the client terminal 10. Based on this instruction, the communication control unit 31 releases the line connection between itself and the communication control portion 14 of the client terminal 10 (S304).

This releasing of the line connection stops the displaying of image data sent from the client terminal 10 in the relevant area 36a on the screen of the divided-by-4 monitor 36.

After instructing the communication control unit 31 for disconnection with the client terminal 10, the center terminal 34 decides to feed out the output data sent from another client terminal 10a and sends an RS command to that effect to both the video switcher 32 and the audio switcher 33 (S305). With this, the display by the CRT34a at the center terminal 34 is switched to the image data sent from the client terminal 10a. The output from the headset 35 is also switched to the speech data sent from the client terminal 10a.

If, however, a plurality of client terminals 10a etc. other than the client terminal 10 to which a "disconnection request" is made are connected via the line, the center terminal 34 may pick up one of the client terminals 10a etc. whose output data is to be fed out, as follows. For example, by setting a priority order among the client terminals 10, 10a etc. beforehand, the system can decide the output data to be fed out, based on that priority order. Also, by storing the hysteresis of "connection request", "connection switch-over request," and "disconnection request," from each client terminal 10, 10a, the system can decide the output data to be fed out, based on this hysteresis, for example, feed out the output data sent from a client terminal with the most recent request.

If, it receives a "disconnection request" from a client terminal when feeding out the output data from the client terminal 10, the monitor terminal 30 automatically switches feed-out of the output data based on this "disconnection request" from the client terminal 10a. That is, switch-over of the output data is automatically made depending on the operational situation of the user at the client terminal 10, 10a etc.

As can be seen from the above, the monitor terminal 30 in a system according to this embodiment comprises: a plurality of communication control units 31, 31a etc. which correspond to the client terminals 10, 10a etc.; a video switcher 32 and an audio switcher 33 which select the output data obtained by those control units; and a center terminal 34 which sends an RS command required for this selection. With this, this system can choose desired output data from among the information sent from the client terminal 10, 10a etc., based on a "connection request,""connection switch-over request," or "disconnection request" and then feed out this output data to the CRT34a and the headset 35 at the monitor terminal 30.

That is, this system switches a plurality of client terminals 10, 10a etc. one of which is to feed out its output data from the CRT34a and the headset 35, depending on the operational situation of the user at the client terminal. Therefore, this system need not switch a line connection each time output data is fed out from client terminals 10, 10a etc. even if more than one is installed in a communication line network, nor need the operator at the center terminal 41 perform operations necessary for switching the output data. With this feature, this system, unlike the conventional ones, will eliminate an unnecessary burden on the operator at the center terminal 34 when the monitor terminal 30 tries to monitor the operational situation of a plurality of client terminals 10, 10a etc., thereby preventing accompanying mistakes in operation.

Moreover, the system according to this embodiment is provided with the CRT34a at the center terminal 34 as well as a divided-by-4 monitor 36 on the side of the monitor terminal 30, which can simultaneously display the image data sent from the plurality of client terminals 10, 10a etc. This feature will show you the situation of the client terminals 10, 10a etc. by checking the contents displayed by the divided-by-4 monitor 36 even when the CRT34a at the center terminal 34 displays only the output data sent from one of those client terminals. That is, the CRT34a at the center terminal 34 plus this divided-by-4 monitor 36 provided will let you know the situation of the client terminals 10, 10a etc. even when the output data displayed by the CRT34a is switched automatically, thus enabling it to easily and appropriately, for example, switch manually the display by the CRT34a as required based on the contents displayed on the divided-by-4 monitor 36.

Although this embodiment has been described with respect to the case where the divided-by-4 monitor 36 displays image data from the client terminals 10, 10a etc. in its four subdivided areas of 36a through 36d, the present invention is not limited to this, so that the data can be displayed in, for example, two or eight subdivided areas on the monitor screen.

Also, although this embodiment has been described for the case where the output data from a client terminal with an output request is fed out on the side of the monitor terminal 30, it is of course possible to feed out the image and speech data entered at the monitor terminal 30 from a client terminal requested to feed out that data.

As mentioned above, an unattended automatic contract reception system according to the present invention can switch the output data fed out on the side of the monitor terminal, based on an output request sent from each client terminal, i.e., depending on the operational situation of the user at each client terminal.

Therefore, unlike the conventional systems, this type of unattended automatic contract reception system will eliminate an unnecessary burden on the operator at the monitor terminal even when the monitor terminal tries to monitor a plurality of client terminals simultaneously, thus preventing accompanying mistakes in operation.

The foregoing description of preferred embodiments has been presented with respect to an unattended automatic contract reception system according to the present invention with reference to the accompanying drawings. It is not intended to be exhaustive or to limit the present invention to the precise form described, and obviously many modifications and variations are possible in light of the above teaching without departing from the scope thereof. The embodiment was chosen in order to explain most clearly the principles of the present invention and its practical application thereby to enable others in the art to utilize most effectively the present invention in various embodiments and with various modifications as are suited to the particular use contemplated.

The entire disclosure of Japanese Patent Application No. 9-45065 filed on Feb. 28, 1997 including specification, claims, drawings, and summary is incorporated herein by reference in its entirety.

What is claimed is:

1. An unattended automatic contract reception system comprising:

a plurality of client terminals at which a user enters a prescribed contract data, to make an unattended contract with a host enterprise; and a monitor terminal connected with each of said plurality of client terminals via a communications line network, wherein each of said plurality of client terminals comprises:
a client-data capture unit which captures image data and speech data of a client as client data;
a data transmission unit which sends said contract data and said client data; and
an output request transmission unit which sends an output request concerning said client data; and said monitor terminal comprises:
a plurality of data reception units which receive data sent from respective ones of said client terminals;
an output unit which sends out image data and speech data; and
a selection unit which is connected to said data reception units and which, whenever said monitor terminal receives an output request from one of the client terminals, automatically selects the client terminal that sent the output request and outputs image data and speech data from the selected client terminal to at least said output unit.

2. The unattended automatic contract reception system as claimed in claim 1, wherein said output unit displays the contents of a screen displayed at a client terminal chosen by said selection unit.

3. The unattended automatic contract reception system as claimed in claim 1, wherein said output unit has a screen having an overlay display of the image data of client data concerning a client terminal chosen by said selection unit.

4. The unattended automatic contract reception system as claimed in claim 1, wherein said selection unit automatically switches said client data fed out to said output unit each time said output request occurs.

5. The unattended automatic contract reception system as claimed in claim 1, wherein said monitor terminal is provided with a division-type image display unit that can simultaneously display various image data of said client data sent from said each client terminal on one screen.

* * * * *